(12) United States Patent
Ishii et al.

(10) Patent No.: US 11,281,054 B2
(45) Date of Patent: Mar. 22, 2022

(54) PHOTOCHROMIC SYSTEM, METHOD FOR DRIVING PHOTOCHROMIC FILM, AND VEHICLE

(71) Applicant: DAI NIPPON PRINTING CO., LTD., Tokyo (JP)

(72) Inventors: Norio Ishii, Tokyo (JP); Tomoya Kawashima, Tokyo (JP)

(73) Assignee: DAI NIPPON PRINTING CO., LTD., Tokyo (JP)

(*) Notice: Subject to any disclaimer, the term of this patent is extended or adjusted under 35 U.S.C. 154(b) by 28 days.

(21) Appl. No.: 16/320,012

(22) PCT Filed: Jul. 25, 2017

(86) PCT No.: PCT/JP2017/026865
§ 371 (c)(1),
(2) Date: Jan. 23, 2019

(87) PCT Pub. No.: WO2018/021308
PCT Pub. Date: Feb. 1, 2018

(65) Prior Publication Data
US 2019/0243174 A1    Aug. 8, 2019

(30) Foreign Application Priority Data
Jul. 26, 2016 (JP) .............................. JP2016-146437

(51) Int. Cl.
*G02F 1/1343* (2006.01)
*G02F 1/13* (2006.01)
(Continued)

(52) U.S. Cl.
CPC .............. *G02F 1/1343* (2013.01); *G02F 1/13* (2013.01); *G02F 1/13306* (2013.01);
(Continued)

(58) Field of Classification Search
CPC .... G02F 1/1343; G02F 1/13; G02F 1/133711; G02F 1/13306; G02F 1/13737;
(Continued)

(56) References Cited

U.S. PATENT DOCUMENTS 6,724,452 B1    4/2004  Takeda et al.
2007/0195034 A1  8/2007  Hayashi et al.
(Continued)

FOREIGN PATENT DOCUMENTS

AU    2003244209 A1    1/2004
EP    3444656 A1       2/2019
(Continued)

OTHER PUBLICATIONS

Dec. 20, 2019 Search Report issued in European Patent Application No. EP17834310.9.
(Continued)

*Primary Examiner* — Ruiyun Zhang
(74) *Attorney, Agent, or Firm* — Oliff PLC

(57) ABSTRACT

A photochromic system wherein: there are provided a photochromic film and a drive power source; the photochromic film has a liquid crystal layer sandwiched between a first and second laminate, the photochromic film controlling the liquid crystal molecules' orientation of the liquid crystal layer by a VA scheme to control transmitted light; the first laminate is provided with at least a first substrate and electrode; the second laminate is provided with at least a second substrate and electrode; each of the first and second electrode has a sheet resistance of 50-300 Ω/□; the distance from a power feed point to the farthest-away position in the surface of the photochromic film is 1,500 mm or less; and the drive power source supplies a power source for driving by a rectangular wave having a frequency of 240 Hz or less.

8 Claims, 11 Drawing Sheets

(51) Int. Cl.
*G02F 1/133* (2006.01)
*G02F 1/1337* (2006.01)
*G02F 1/137* (2006.01)

(52) U.S. Cl.
CPC .... *G02F 1/133711* (2013.01); *C09K 2323/00* (2020.08); *C09K 2323/02* (2020.08); *G02F 1/13439* (2013.01); *G02F 1/13725* (2013.01); *G02F 1/133742* (2021.01)

(58) Field of Classification Search
CPC ......... G02F 133/742; G02F 133/13712; B60R 1/088; Y10T 428/10; C09K 2323/00; C09K 2323/02
USPC .............. 428/1.1, 1.2; 345/87; 349/1, 16, 89
See application file for complete search history.

(56) References Cited

U.S. PATENT DOCUMENTS

| | | | | |
|---|---|---|---|---|
| 2012/0257123 A1* | 10/2012 | Lee | .................... | G02F 1/13737 349/1 |
| 2016/0026026 A1* | 1/2016 | Kim | .................... | G02F 1/13394 349/88 |

FOREIGN PATENT DOCUMENTS

| | | |
|---|---|---|
| JP | H03-047392 A | 2/1991 |
| JP | H08-184273 A | 7/1996 |
| JP | H11-242225 A | 9/1999 |
| JP | 2003-140193 A | 5/2003 |
| JP | 2004-77845 A | 3/2004 |
| JP | 2005-114875 A | 4/2005 |
| JP | 2010-230759 A | 10/2010 |
| JP | 2012-031384 A | 2/2012 |
| JP | 2013-007935 A | 1/2013 |
| JP | 2013-139521 A | 7/2013 |
| JP | 2015-215417 A | 12/2015 |
| JP | 2016-133628 A | 7/2016 |
| WO | 2004/005426 A1 | 1/2004 |

OTHER PUBLICATIONS

Schadt et al.; "Surface-Induced Parallel Alignment of Liquid Crystals by Linearly Polymerized Photopolymers"; Jpn. J. Appl. Phys. vol. 31; pp. 2155-2164; Published Mar. 7, 1992.

Schadt et al.; "Optical patterning of multi-domain liquid-crystal displays with wide viewing angles"; Letters to Nature, vol. 381; pp. 212-215; May 16, 1996.

Oct. 17, 2017 International Search Report issued in International Patent Application No. PCT/JP2017/026865.

Jan. 29, 2021 Office Action issued in European Patent Application No. 17834310.9.

* cited by examiner

FIG. 4

| FREQUENCY OF POWER SOURCE | L(mm) | | | | | | | | | | | |
|---|---|---|---|---|---|---|---|---|---|---|---|---|
| | 25 | 50 | 150 | 250 | 500 | 650 | 800 | 1250 | 1500 | 2000 | 3000 |
| 4Hz | 33.07 | 32.98 | 32.96 | 32.92 | 32.796 | 32.721 | 32.646 | 32.421 | 32.296 | 32.046 | 31.546 |
| 8Hz | 33.06 | 32.96 | 32.95 | 32.91 | 32.781 | 32.706 | 32.631 | 32.406 | 32.281 | 32.031 | 31.531 |
| 15Hz | 33.04 | 32.94 | 32.94 | 32.89 | 32.762 | 32.687 | 32.612 | 32.387 | 32.262 | 32.012 | 31.512 |
| 30Hz | 33.01 | 32.9 | 32.89 | 32.84 | 32.679 | 32.589 | 32.499 | 32.229 | 32.079 | 31.779 | 31.179 |
| 60Hz | 32.89 | 32.82 | 32.82 | 32.76 | 32.577 | 32.487 | 32.397 | 32.127 | 31.977 | 31.677 | 31.077 |
| 120Hz | 32.78 | 32.64 | 32.63 | 32.56 | 32.342 | 32.222 | 32.102 | 31.742 | 31.542 | 31.142 | 30.342 |
| 240Hz | 32.03 | 31.54 | 31.3 | 31.14 | 30.249 | 29.754 | 29.259 | 27.774 | 27.002 | 25.299 | 21.999 |
| 360Hz | 30.60 | 30.32 | 29.19 | 28.06 | 25.235 | 23.54 | 21.845 | 16.76 | 13.935 | 8.285 | LESS THAN 5% |
| 480Hz | 30.24 | 23.64 | 20.92 | 18.56 | 6.871 | LESS THAN 5% | LESS THAN 5% | LESS THAN 5% | LESS THAN 5% | LESS THAN 5% | LESS THAN 5% |
| 510Hz | 30.04 | 23.13 | 19.54 | 15.91 | LESS THAN 5% | LESS THAN 5% | LESS THAN 5% | LESS THAN 5% | LESS THAN 5% | LESS THAN 5% | LESS THAN 5% |

FIG. 5

| FREQUENCY OF POWER SOURCE | L(mm) | | | | | | | | | | | |
|---|---|---|---|---|---|---|---|---|---|---|---|---|
| | 25 | 50 | 150 | 250 | 500 | 650 | 800 | 1250 | 1500 | 2000 | 3000 |
| 4Hz | ○ | ○ | ○ | ○ | ○ | ○ | ○ | ○ | ○ | ○ | ○ |
| 8Hz | ○ | ○ | ○ | ○ | ○ | ○ | ○ | ○ | ○ | ○ | ○ |
| 15Hz | ○ | ○ | ○ | ○ | ○ | ○ | ○ | ○ | ○ | ○ | ○ |
| 30Hz | ○ | ○ | ○ | ○ | ○ | ○ | ○ | ○ | ○ | ○ | ○ |
| 60Hz | ○ | ○ | ○ | ○ | ○ | ○ | ○ | ○ | ○ | ○ | ○ |
| 120Hz | ○ | ○ | ○ | ○ | ○ | ○ | ○ | ○ | ○ | ○ | ○ |
| 240Hz | ○ | × | × | △ | × | × | × | △ | △ | × | × |
| 360Hz | ○ | × | × | × | × | × | × | × | × | × | × |
| 480Hz | ○ | × | × | × | × | × | × | × | × | × | × |
| 510Hz | ○ | × | × | × | × | × | × | × | × | × | × |

FIG. 9

| FREQUENCY OF POWER SOURCE | L (mm) | | | | | | | | | |
|---|---|---|---|---|---|---|---|---|---|---|
| | 25 | 50 | 100 | 250 | 500 | 650 | 800 | 1250 | 1500 | 2000 |
| 4Hz | 39.4544 | 39.1032 | 38.8136 | 37.5836 | 35.5336 | 34.3036 | 33.0736 | 31.4336 | 27.3336 | 23.2336 |
| 8Hz | 39.5061 | 39.152 | 38.8111 | 37.4761 | 35.2511 | 33.9161 | 32.5811 | 30.8011 | 26.3511 | 21.9011 |
| 15Hz | 39.4574 | 39.1217 | 38.6965 | 37.2115 | 34.7365 | 33.2515 | 31.7665 | 29.7865 | 24.8365 | 19.8865 |
| 30Hz | 39.3591 | 39.019 | 38.5272 | 36.8922 | 34.1672 | 32.5322 | 30.8972 | 28.7172 | 23.2672 | 17.8172 |
| 60Hz | 39.413 | 39.0616 | 38.4702 | 36.5952 | 33.4702 | 31.5952 | 29.7202 | 27.4202 | 20.9702 | 14.7202 |
| 120Hz | 39.4628 | 39.0809 | 38.4744 | 36.5244 | 33.2744 | 31.3244 | 29.3744 | 27.0744 | 20.2744 | 13.7744 |
| 240Hz | 39.4576 | 39.0601 | 38.4594 | 36.4944 | 33.2194 | 31.2544 | 29.2894 | 26.8694 | 20.1194 | 13.5694 |
| 480Hz | 39.3563 | 38.9468 | 38.3589 | 36.3939 | 33.1189 | 31.1539 | 29.1889 | 26.5689 | 20.0189 | 13.4689 |
| 1000Hz | 39.1182 | 38.6707 | 38.1331 | 36.2131 | 33.0131 | 31.0931 | 29.1731 | 26.6131 | 20.2131 | 13.8131 |

FIG. 10

| Frequency of power source | L (mm) | | | | | | | | | | |
|---|---|---|---|---|---|---|---|---|---|---|---|
| | 25 | 50 | 100 | 250 | 500 | 650 | 800 | 1250 | 1500 | 2000 |
| 4Hz | ○ | ○ | ○ | ○ | ○ | ○ | ○ | ○ | △ | × |
| 8Hz | ○ | ○ | ○ | ○ | ○ | ○ | ○ | ○ | △ | × |
| 15Hz | ○ | ○ | ○ | ○ | ○ | ○ | ○ | ○ | × | × |
| 30Hz | ○ | ○ | ○ | ○ | ○ | ○ | ○ | △ | × | × |
| 60Hz | ○ | ○ | ○ | ○ | ○ | ○ | ○ | △ | × | × |
| 120Hz | ○ | ○ | ○ | ○ | ○ | ○ | ○ | △ | × | × |
| 240Hz | ○ | ○ | ○ | ○ | ○ | ○ | ○ | △ | × | × |
| 480Hz | ○ | ○ | ○ | ○ | ○ | ○ | ○ | △ | × | × |
| 1000Hz | ○ | ○ | ○ | ○ | ○ | ○ | ○ | △ | × | × |

PHOTOCHROMIC SYSTEM, METHOD FOR DRIVING PHOTOCHROMIC FILM, AND VEHICLE

TECHNICAL FIELD

The present invention relates to a light modulating film that can be used for an electronic blind or the like that is attached to, for example, a window of a vehicle, a window of a building, or the like to control transmission of external light.

BACKGROUND ART

Conventionally, there have been proposed various techniques relating to a light modulating film that is attached to, for example, a window to control transmission of external light (Patent Documents 1 and 2). As one of such light modulating films, there is a light modulating film using liquid crystal. In this light modulating film using the liquid crystal, liquid crystal cells are produced by interposing a liquid crystal material with transparent film materials on which a transparent electrode is prepared, and the liquid crystal cells are interposed between linear polarization plates. By doing so, in this light modulating film, the alignment of the liquid crystal is changed by varying the electric field applied to the liquid crystal to shield or transmit external light, and in addition, the amount of the transmitted light is varied, so that the transmission of the external light is controlled.

For driving liquid crystal cells in such a light modulating film, various driving types proposed for liquid crystal display panels can be applied. Specifically, a driving type such as a Twisted Nematic (TN) type, an In-Plane-Switching (IPS) type, a Vertical Alignment (VA) type can be applied.

In addition, for driving the liquid crystal cells, there are a single-domain type and a multi-domain type, and a technique for improving a viewing angle characteristic by implementing the multi-domain type is proposed in Patent Document 3.

Herein, the VA type is a type of controlling the transmitted light by changing the alignment of the liquid crystal between the vertical alignment and the horizontal alignment. In general, the liquid crystal is vertically aligned at the time of application of no electric field, and the liquid crystal cell is formed by interposing the liquid crystal layer between the vertical alignment layers, so that the liquid crystal material is horizontally aligned by applying an electric field. The multi-domain type is a type of providing a plurality of regions (domains) in which liquid crystal molecules behave differently with respect to a change of the electric field. In general, the multi-domain type is applied in order to improve a viewing angle characteristic by averaging (integrating) optical characteristics in a plurality of regions. The single-domain type is a type in which only one domain is provided in the liquid crystal cell.

In addition, as this type of light modulating film, one using a guest-host liquid crystal has been proposed (Patent Documents 4 and 5). In such a liquid crystal cell using a guest-host liquid crystal, the amount of transmitted light is controlled by changing the state in which the liquid crystal molecules and the dichroic dye are randomly aligned and the state in which the liquid crystal molecules and the dichroic dye are so-called twist orientated by controlling the electric field.

By the way, it is expected that the light modulating film is attached to, for example, a window glass or the like and used for various purposes due to a large area. Therefore, it is desired that the light modulating film can be manufactured with a simple structure. In addition, when the light modulating film is used by being attached to a window glass, it is also expected that the light modulating film is responsible for a function of a curtain, so that the light modulating film is required to be able to sufficiently shield the incident light. By doing so, it is conceivable to drive with the single-domain type or the guest-host type of VA type.

However, even in the case of applying the single-domain type or the guest-host type based on the VA type, it is desired that the light modulating film have high performance with respect to the control of the transmitted light.

Patent Document 1: Japanese Unexamined Patent Application, Publication No. H03-47392

Patent Document 2: Japanese Unexamined Patent Application, Publication No. H08-184273

Patent Document 3: Japanese Unexamined Patent Application, Publication No. H11-242225

Patent Document 4: Japanese Unexamined Patent Application, Publication No. 2013-139521

Patent Document 5: Japanese Unexamined Patent Application, Publication No. 2012-31384

DISCLOSURE OF THE INVENTION

Problems to be Solved by the Invention

The present invention has been made in view of the above circumstances, and the present invention is to ensure high performance with respect to control of transmitted light in a light modulating film using a single-domain type of a VA type and a light modulating film using a guest-host type.

Means for Solving the Problems

The present inventors have studied hard in order to solve the above-mentioned problems and have examined the driving frequency, the transmittance, the resistance value of the electrode, and the like, which leads to the completion of the present invention.

Specifically, the present invention provides the followings.

(1) A light modulating system including a light modulating film and a drive power source supplying a drive power to the light modulating film, in which the light modulating film is a light modulating film in which a liquid crystal layer is interposed between a first laminated body and a second laminated body and transmitted light is controlled by the liquid crystal layer of a VA type, in which the first laminated body includes at least a first substrate and a first electrode, in which the second laminated body includes at least a second substrate and a second electrode, in which each of the first electrode and the second electrode has sheet resistance of 50Ω/□ or more and 300Ω/□ or less, and a distance from a power feed point to a farthest-away position in a surface of the light modulating film is 1,500 mm or less, and or less, in which the drive power source supplies the drive power with a rectangular wave having a frequency of 240 Hz or less.

(2) The light modulating system according to (1), in which the drive power source supplies the drive power with a rectangular wave having a frequency of more than 45 Hz.

(3) The light modulating system according to (1) or (2), in which the distance from the power feed point to the farthest-away position in the surface of the light modulating film is 50 mm or more.

(4) The light modulating system according to any one of (1) to (3), in which each of the laminated body of the first substrate and the first electrode and the laminated body of the second substrate and the second electrode has total light transmittance of 85% or more and 92% or less.

(5) A vehicle provided with the light modulating system according to any one of (1) to (4).

(6) A method for driving a light modulating film by supplying a drive power from a drive power source, in which the light modulating film is a light modulating film in which a liquid crystal layer is interposed between the first laminated body and the second laminated body, and transmitted light is controlled by the liquid crystal layer of a VA type, in which the first laminated body includes at least a first substrate and a first electrode, in which the second laminated body includes at least a second substrate and a second electrode, in which each of the first electrode and the second electrode has sheet resistance of 50Ω/□ or more and 300Ω/□ or less, and a distance from a power feed point to a farthest-away position in a surface of the light modulating film is 1,500 mm or less, and in which the drive power source supplies a drive power with a rectangular wave having a frequency of 240 Hz or less.

(7) A light modulating system comprising a light modulating film and a drive power source supplying a drive power to the light modulating film, in which the light modulating film is a light modulating film in which a liquid crystal layer containing liquid crystal molecules and a dichroic dye is interposed between a first laminated body and a second laminated body, and transmitted light is controlled by controlling alignment of the liquid crystal molecules and the dichroic dye of the liquid crystal layer, in which the first laminated body is formed by laminating, includes at least a first substrate and a first electrode, in which the second laminated body, includes at least a second substrate and a second electrode, in which each of the first electrode and the second electrode has sheet resistance of 50Ω/□ or more and 300Ω/□ or less, and a distance from a power feed point to a farthest-away position in a surface of the light modulating film is 1,250 mm or less, and in which the drive power source supplies a drive power with a rectangular wave having a frequency of 480 Hz or less.

(8) The light modulating system according to (7), in which the drive power source supplies the drive power with a rectangular wave having a frequency of more than 45 Hz.

(9) The light modulating system according to (7) or (8), in which the distance from the power feed point to the farthest-away position in the surface of the light modulating film is 50 mm or more.

(10) The light modulating system according to any one of (7) to (9), in which each of the laminated body of the first substrate and the first electrode and the laminated body of the second substrate and the second electrode has total light transmittance of 85% or more and 92% or less.

(11) A vehicle provided with the light modulating system according to any one of (7) to (10).

(12) A method for driving a light modulating film supplying a drive power from a drive power source, in which the light modulating film is a light modulating film in which a liquid crystal layer is interposed between a first laminated body and a second laminated body, and transmitted light is controlled by the liquid crystal layer of a guest-host type, in which the first laminated body includes at least a first substrate and a first electrode, in which the second laminated body includes at least a second substrate and a second electrode, in which each of the first electrode and the second electrode has sheet resistance of 50Ω/□ or more and 300Ω/□ or less, and a distance from a power feed point to a farthest-away position in a surface of the light modulating film is 1,250 mm or less, and in which the drive power source supplies a drive power with a rectangular wave having a frequency of 480 Hz or less.

Effects of the Invention

According to the present invention, it is possible to ensure high performance with respect to the control of the transmitted light in a light modulating film of a single-domain type of a VA type and a light modulating film of a guest-host type.

BRIEF DESCRIPTION OF THE DRAWINGS

FIG. 4 is a diagram illustrating a relationship between transmittance and a power source frequency at a distance L from the power feed point of the light modulating system in FIG. 2 at the time of light transmission.

FIG. 5 is a diagram illustrating determination result of the transmittance in FIG. 4.

FIG. 9 is a diagram illustrating a relationship between transmittance and a power source frequency at a distance L from the power feed point at the time of light transmission of the light modulating system according to the second embodiment of the present invention.

FIG. 10 is a diagram illustrating a determination result of the transmittance in FIG. 9.

PREFERRED MODE FOR CARRYING OUT THE INVENTION

First Embodiment

[Light Modulating Film]

Figure 1:
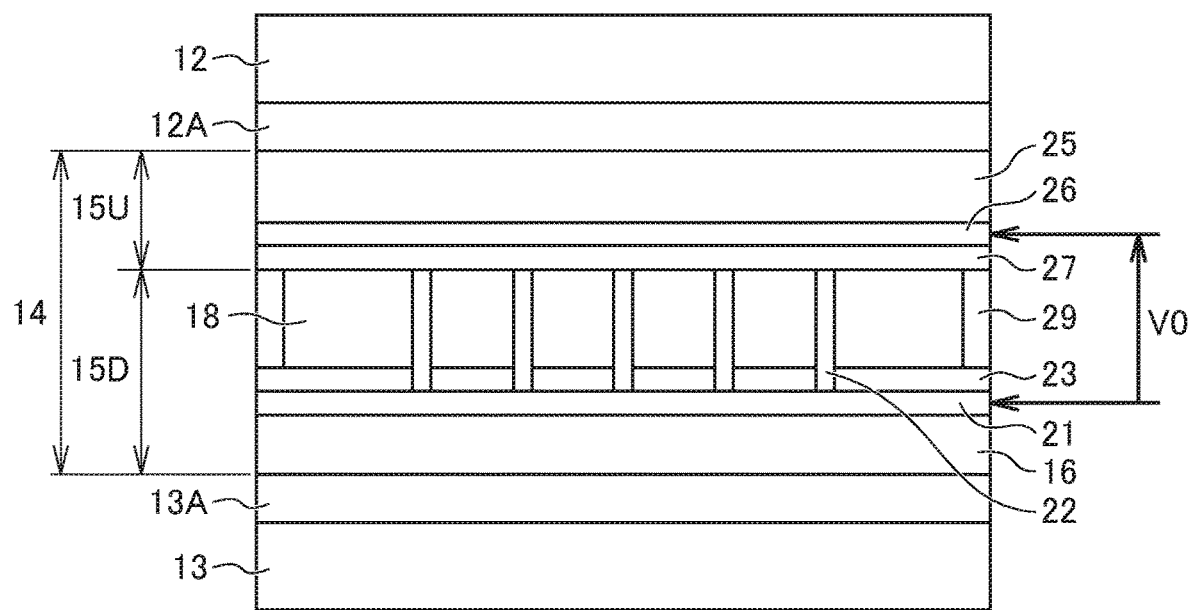
FIG. 1 is a diagram illustrating a light modulating film applied for a light modulating system according to a first embodiment of the present invention.

FIG. 1 is a cross-sectional diagram illustrating a light modulating film applied for a light modulating system according to a first embodiment of the present invention. This light modulating film 10 is a film material that controls transmitted light by using liquid crystal, and controls the transmitted light by changing the alignment of the liquid crystal of a single-domain type of the VA type by varying the applied voltage.

The light modulating film 10 is configured by interposing the liquid crystal cell 14 for the light modulating film with the linear polarization plates 12 and 13. Herein, the linear polarization plates 12 and 13 are formed by impregnating polyvinyl alcohol (PVA) with iodine or the like and then stretching to form an optical functional layer performing an optical function as a linear polarization plate and interposing the optical functional layer with the substrate made of the transparent film material such as a triacetyl cellulose (TAC). The linear polarization plates 12 and 13 are arranged on the liquid crystal cell 14 by adhesive layers made of an ultraviolet curable resin or the like by crossed Nicols arrangement. In addition, although phase difference films 12A and 13A for optical compensation are provided on the liquid crystal cell 14 sides of the linear polarization plates 12 and 13, respectively, the phase difference films 12A and 13A may be omitted if necessary.

The liquid crystal cell 14 controls the polarization plane of the transmitted light by the voltage applied to the transparent electrode described later. By doing so, the light modulating film 10 is configured so as to be able to perform various types of light control by controlling the transmitted light.

[Liquid Crystal Cell]

The liquid crystal cell 14 is configured by interposing the liquid crystal layer 18 with a lower laminated body 15D and an upper laminated body 15U which are first and second laminated bodies in the form of a film. The lower laminated body 15D is formed by manufacturing a transparent electrode 21, a spacer 22, and an alignment layer 23 on a substrate 16 made of a transparent film material. The upper laminated body 15U is formed by laminating a transparent electrode 26 and an alignment layer 27 on a substrate 25 made of a transparent film material. The liquid crystal cell 14 controls the alignment of the liquid crystal provided in the liquid crystal layer 18 of a VA type by driving the transparent electrodes 21 and 26 provided in the lower laminated body 15D and the upper laminated body 15U, so that the polarization plane of the transmitted light is controlled. In this embodiment, the liquid crystal cell 14 is configured of a single-domain type.

Although various transparent film materials which can be applied as this type of film material can be applied for the substrates 16 and 25, it is preferable to apply a film material having small optical anisotropy. For the substrates 16 and 25, a polycarbonate film may be applied, and in addition, a COP (cycloolefin polymer) film or the like may be applied.

Various electrode materials which are applied as this type of the film material can be applied for the transparent electrodes 21 and 26 (hereinafter, sometimes, simply referred to as the electrodes 21 and 26), and in this embodiment, the transparent electrodes are formed of an electrode material made of indium tin oxide (ITO). Although the spacer 22 is provided for regulating the thickness of the liquid crystal layer 18, and various resin materials can be widely applied, in this embodiment, the spacer 22 is produced by a photoresist and is produced by coating the photoresist on the substrate 16 on which the transparent electrode 21 is formed and performing exposure and development. In addition, the spacer 22 may be provided on the upper laminated body 15U or may be provided on both of the upper laminated body 15U and the lower laminated body 15D. In addition, the spacer 22 may be provided on the alignment layer 23. As the spacer, a so-called bead spacer may be applied.

The alignment layers 23 and 27 are formed by light alignment layers. Herein, although various types of materials to which the light alignment scheme can be applied can be widely applied as the light alignment material which can be applied for the light alignment layer, in this embodiment, for example, a photodimerization type material is used. The photodimerization type materials disclose in "M. Schadt, K. Schmitt, V. Kozinkov and V. Chigrinov: Jpn. J. Appl. Phys., 31, 2155 (1992)", "M. Schadt, H Seiberle and A. Schuster: Nature, 381, 212 (1996)", and the like.

Various liquid crystal materials which can be applied for this type of light modulating film can be widely applied for the liquid crystal layer 18. Specifically, for example, a liquid crystal material such as MLC 2166 manufactured by Merck Ltd., can be applied for the liquid crystal layer 18. In addition, in the liquid crystal cell 14, the sealing material 29 is arranged so as to surround the liquid crystal layer 18, and the upper laminated body 15U and the lower laminated body 15D are integrally retained by the sealing material 29, so that leakage of the liquid crystal material is prevented. Herein, for example, an epoxy resin, an ultraviolet curable resin, or the like can be applied as the sealing material 29.

By doing so, the light modulating film 10 controls the alignment of the liquid crystal provided in the liquid crystal layer 18 by the drive power applied to the transparent electrodes 21 and 26 of the upper laminated body 15U and the lower laminated body 15D and controls the amount of the transmitted light.

[Light Modulating System]

Figure 2:
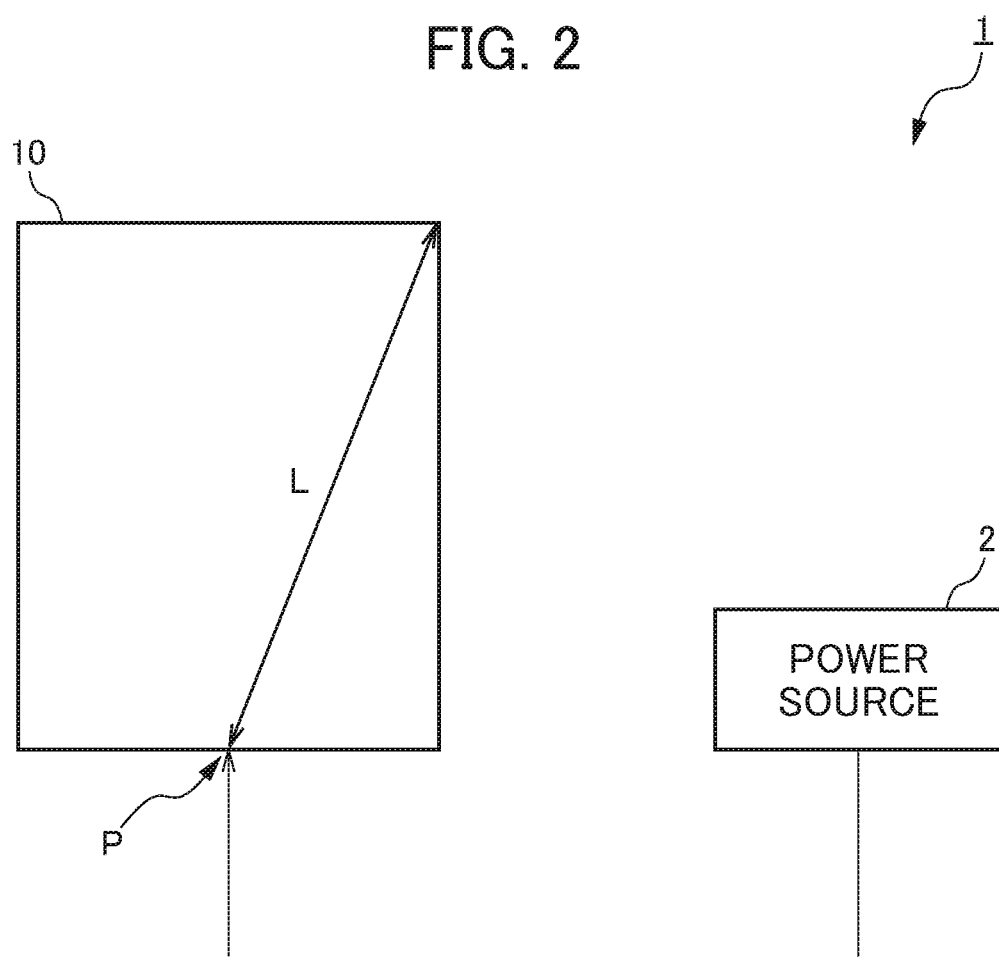
FIG. 2 is a diagram illustrating the light modulating system according to the first embodiment of the present invention.

FIG. 2 is a diagram illustrating the light modulating system 1 using the light modulating film 10. In the light modulating system 1, the light modulating film 10 is attached and retained to a portion (a front window, a side window, a rear window, a roof window, or the like) of a vehicle where external light is incident or a portion of a window glass, a transparent partition, or the like in which light control is performed. The light modulating system 1 supplies a drive power from the drive power source 2 to the light modulating film 10, so that the drive power V0 is supplied to the transparent electrodes 21 and 26. In the light modulating system 1, the amplitude of the drive power V0 is varied by user's operation or the like, so that the transmittance of the light modulating film 10 is controlled to control the lighting.

Herein, the light modulating film 10 is formed in a square shape in a plan view, and a power feed point P is provided substantially at the center of one side related to the square shape. Herein, the power feed point P is a power feed point for feeding the drive power V0 supplied from the drive power source 2 to the transparent electrodes 21 and 26. For example, the power feed point is formed by arranging a double-sided flexible wiring board connected to the drive power source 2 between the transparent electrodes 21 and 26 which are extended outward the sealing material 29 and retained so as to face each other. The light modulating film 10 is manufactured with a side having a length of 280 mm.

The drive power source 2 supplies a drive power V0 in an amplitude range of 0 V to 20 V by a rectangular wave having a frequency of more than 45 Hz and a frequency of 240 Hz or less, preferably by a rectangular wave having a frequency of 60 Hz or more and 120 Hz or less, more preferably by a rectangular wave having a frequency of 60 Hz or more and 80 Hz or less. By doing so, in the light modulating system 1, sufficient transmittance is ensured, and the light modulating film 10 is efficiently driven. More specifically, the transmittance at the time of light shielding (at the time of application of no electric field) is set to 1.0% or less, the transmittance at the time of light transmission (in a case where the drive power V0 is supplied with the maximum amplitude) is set to 26% or more. In addition, the transmittance in the present invention denotes the total light transmittance defined by JIS K 7361.

That is, in some cases, this type of light modulating system 1 in which the light modulating film 10 is attached to the window glass may be used for shielding the external light instead of a curtain. In this case, it is preferable to sufficiently shield the transmitted light. As a result of various investigations, in a case where the transmittance at the time of light shielding exceeds 1.0%, an evaluation that the light shielding is insufficient may be obtained. However, in a case where the transmittance at the time of light shielding is 1.0% or less, an evaluation result that light shielding is sufficient may be obtained.

On the other hand, the light modulating film 10 is configured with laminating the linear polarization plates 12 and 13 and the liquid crystal layer 18, so that the transmittance at the time of light transmission is less than 50%. However, in the case of being used while being attached to a window, there are cases where it is aimed to incorporate external light into the indoor at the time of light transmission. In this case, it is preferable to ensure sufficient transmittance. By doing so, in this embodiment, the transmittance at the time of light transmission is set to 26% or more to ensure sufficient transmittance.

[Frequency of Power Source]

Figure 3:
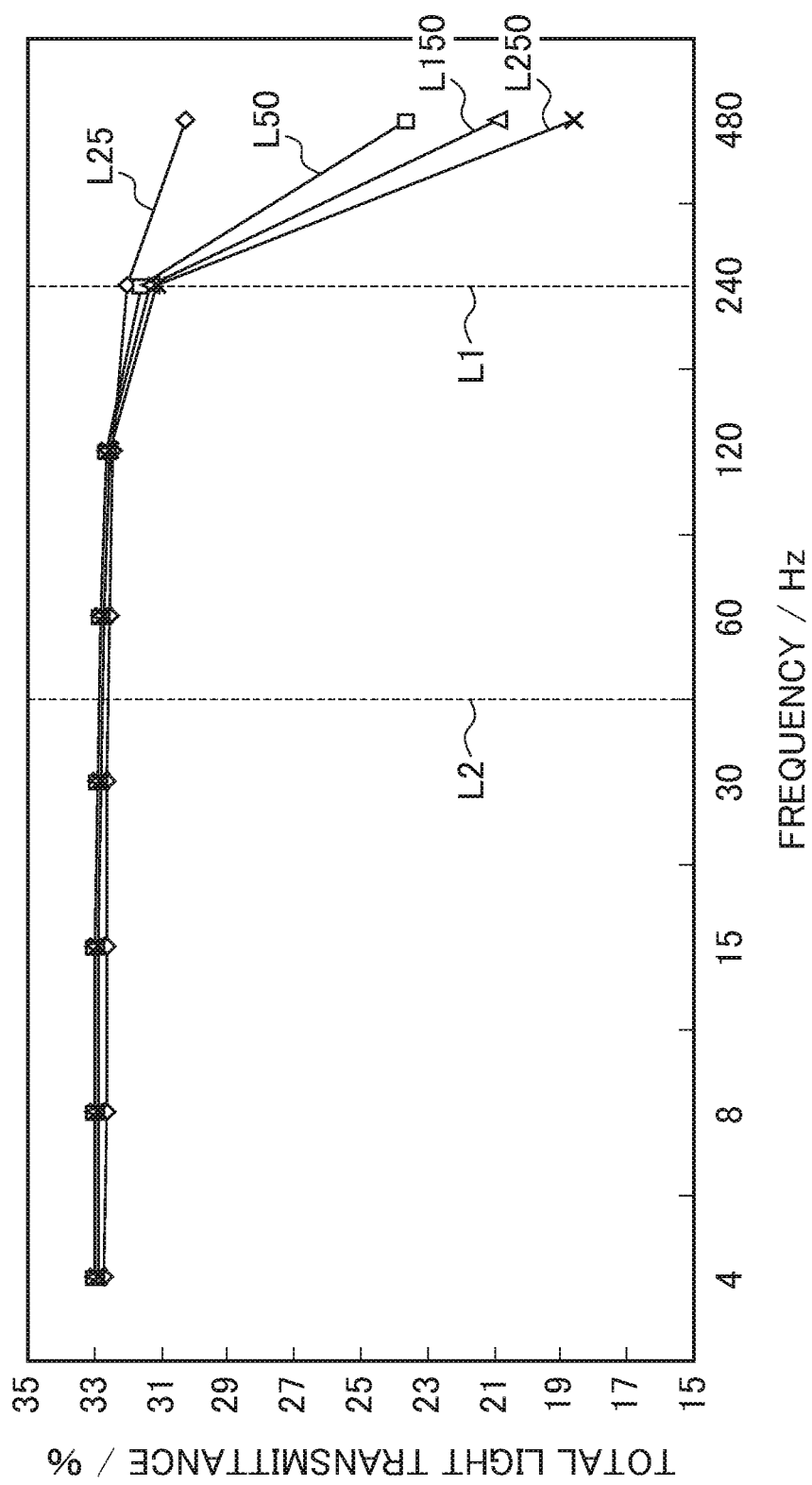
FIG. 3 is a diagram illustrating a measurement result obtained by measuring transmittance at the time of light transmission by varying a frequency of a drive power V.

Herein, FIG. 3 is a diagram illustrating measurement results obtained by measuring the transmittance at the time of light transmission while varying the frequency of the drive power V. L25, L50, L150, and L250 are the measurement results at the positions separated from the power feed point P by the distances of 25 mm, 50 mm, 150 mm, and 250 mm in a direction perpendicular to the extending direction of one side related to the power feed point P, respectively. The light modulating film used for measurement was a light modulating film having a square shape with one side length of 280 mm, and a light modulating film having a power feed point set at one place described above with reference to FIG. 2 was used. In addition, the transparent electrodes 21 and 26 were produced by using ITO with a thickness of 29 nm and sheet resistance of 200Ω/□. For the substrates 16 and 25, a COP film material with a thickness of 100 μm provided with a hard coat layer with a thickness of 1.5 to 3 μm on both sides was applied, and an index matching layer with a thickness of 90 to 110 μm was provided as a lower layer of ITO. In addition, the drive power V0 is a rectangular wave having an amplitude of 10 V and a duty ratio of 50%.

According to the measurement result, it can be understood that, as the frequency becomes higher, the transmittance decreases at a position where the distance from the power feed point P is large, so that the light modulating film is driven at a frequency of 240 Hz or less indicated by the broken line L1, and thus, it is possible to prevent a decrease in transmittance. This decrease in transmittance is considered to be caused by waveform rounding due to charging and discharging of the electrostatic capacitor by the electrodes 21 and 26, and as a result, the applied voltage to the liquid crystal layer 18 is decreased. In addition, if the frequency becomes high as described above, power consumption increases due to charging and discharging of the electrostatic capacitor by the electrodes 21 and 26, and thus, the transmitted light cannot be controlled efficiently.

On the other hand, in a case where the frequency is 45 Hz or less as indicated by the broken line L2, the flicker due to the switching of the polarity at the drive power V0 occurs.

FIG. 4 is a diagram illustrating a relationship between the transmittance and the power source frequency at the distance L from the power feed point of the light modulating system in FIG. 2. Herein, the transmittance of L=25 mm to 250 mm illustrated in FIG. 4 is an actual measurement result, and the transmittance of L=500 mm to 3000 mm is a result obtained by obtaining an approximate expression on the basis of the actual measurement result described above and obtaining the transmittance on the basis of the approximate expression.

FIG. 5 is a diagram illustrating a determination result of the transmittance in FIG. 4. In FIG. 5, "○" indicates transmittance of 29% or more, "Δ" indicates transmittance of 26% or more and less than 29%, and "X" indicates transmittance of less than 26%. The determination results "○" and "Δ" denote that the transmittance is 26% or more and is practically sufficient.

According to FIGS. 4 and 5, at the time of light transmission, in a range where the distance L from the power feed point is 1,500 mm or less, by driving with a rectangular wave having a frequency of 240 Hz or less, it is confirmed that the transmittance can be controlled to a practically sufficient range (transmittance of 26% or more). In addition, as illustrated in FIG. 5, by driving with a rectangular wave having a frequency of 120 Hz or less, it is confirmed that all the determination results of the transmittance can be set to "○", and the transmittance can be controlled to 29% or more. On the other hand, if the driving frequency becomes larger than 240 Hz, it is confirmed that sufficient transmittance cannot be ensured in a case where the distance L is large.

In this embodiment described above, in a range where the distance L from the power feed point is 1,500 mm or less, by supplying the drive power V0 with a rectangular wave having a frequency exceeding 45 Hz and 240 Hz or less, preferably a rectangular wave having a frequency of 60 Hz or more and 120 Hz or less, more preferably a rectangular wave of 60 Hz or more and 80 Hz or less, it is possible to effectively avoid flicker and to ensure sufficient transmittance, and it is possible to more efficiently drive the light modulating film 10.

[Sheet Resistance]

By the way, since the change in the transmittance described above with reference to FIGS. 3 and 4 is caused by the resistance and electrostatic capacitance of the electrodes 21 and 26, the transmittance changes greatly depending on the sheet resistance which is formed by the electrodes 21 and 26. Herein, the sheet resistance denotes a sheet resistance of the transparent electrode 21 and 26 measured in the state of the laminated body of the substrate 16 and the transparent electrode 21 or the laminated body of the substrate 25 and the transparent electrode 26 in FIG. 1.

Therefore, in this embodiment, the electrodes 21 and 26 are set so that the sheet resistance is 50Ω/□ or more and 300Ω/□ or less. In addition, the sheet resistance is preferably set to be 50Ω/□ or more and 200Ω/□ or less, more preferably 50Ω/□ or more and 150Ω/□ or less. Herein, as described above with reference to FIG. 3, with respect to the substrates 16 and 25, in a case where a COP film material having a thickness of 100 μm and provided with a hard coat layer having a thickness of 1.5 to 3 μm on both sides is applied to the substrates 16 and 25, and an index matching layer with a thickness of 90 to 110 μm and an ITO film with a thickness of 29 nm are produced, the electrodes 21 and 26 can be manufactured with sheet resistance of 200Ω/□. Alternatively, instead of this, in a case where a polycarbonate film material having a thickness of 100 μm and provided with a hard coat layer having a thickness of 1.5 to 3 μm on both sides was applied for the substrates 16 and 25, and an index matching layer having a thickness of 90 to 110 μm and an ITO film having a thickness of 29 nm were produced, the electrodes 21 and 26 can be manufactured with sheet resistance of 200Ω/□. In addition, the sheet resistance of the electrode is a value measured with respect to the surface (electrode surface) of the electrode substrate as a measurement object by a test method using a four probe method at the room temperature condition.

More specifically, in the light modulating film 10 as the measurement object, after the lower laminated body 15D and the upper laminated body 15U are peeled off and then washed with an alcohol such as methanol, so that the liquid crystal material of the liquid crystal layer 18 is washed out. After that, the surface is rubbed with a cloth (wiper) impregnated with acetone or N-methyl-2-pyrrolidone, and at a plurality of places in a surface (for example, the centers of nine regions obtained by equally dividing the surface into the nine regions), the alignment layers 23 and 27 are removed to expose the transparent electrodes 21 and 26. Then, the sheet resistance is measured at a plurality of measurement places by using a resistivity meter (Loresta-AX MCP-T370 produced by Mitsubishi Chemical Analytech Co., Ltd.), and the measurement results are averaged to obtain the sheet resistance. In addition, in the processing of these measurement results, among the measurement results at a plurality of the places, at a place (a place having a result exceeding $3\sigma$) of which result greatly deviates from the measurement results of other places, the removal of the alignment layer is estimated to be insufficient, or the damage of the electrode or the like is estimated, so that measurement is performed again at another place as necessary.

As described above, in this embodiment, the electrodes 21 and 26 are produced by setting the sheet resistance to $50\Omega/\square$ or more and $300\Omega/\square$ or less, it is possible to effectively avoid flicker by setting the frequency of the drive power source, and it is possible to ensure sufficient transmittance and to efficiently perform light control. That is, if the sheet resistance increases, the waveform rounding also becomes large, so that the transmittance decreases. In addition, flicker due to a decrease in frequency of the drive power source is also conspicuous. By doing so, even in a case where the light modulating film is driven at the frequency within the above-mentioned range, there is a concern that, the flicker may be perceived, and in addition, the decrease in transmittance may be perceived. By doing so, in this embodiment, it is possible to ensure sufficient transmittance by effectively avoiding the flicker, and it is possible to ensure high performance with respect to the control of the transmitted light.

[Transmittance of Laminated Body]

Even if the sheet resistance is allowed to be reduced as described above, in a case where the transmittance of the electrodes 21 and 26 themselves is reduced, the transmittance decreases as a whole, and the transmittance at the time of light transmission decreases. Therefore, in this embodiment, the transmittance (total light transmittance) of each of the laminated body of the electrode 21 and the substrate 16 and the laminated body of the electrode 26 and the substrate 25 is set to 85% or more and 92% or less, preferably, set to 89% or more and 90% or less. By setting the sheet resistance to $50\Omega/\square$ or more, it is possible to ensure the transmittance described above.

By doing so, in this embodiment, it is possible to ensure sufficient transmittance at the time of light transmission and to ensure high performance with respect to the control of the transmitted light.

[Power Feed Point]

Figure 6:
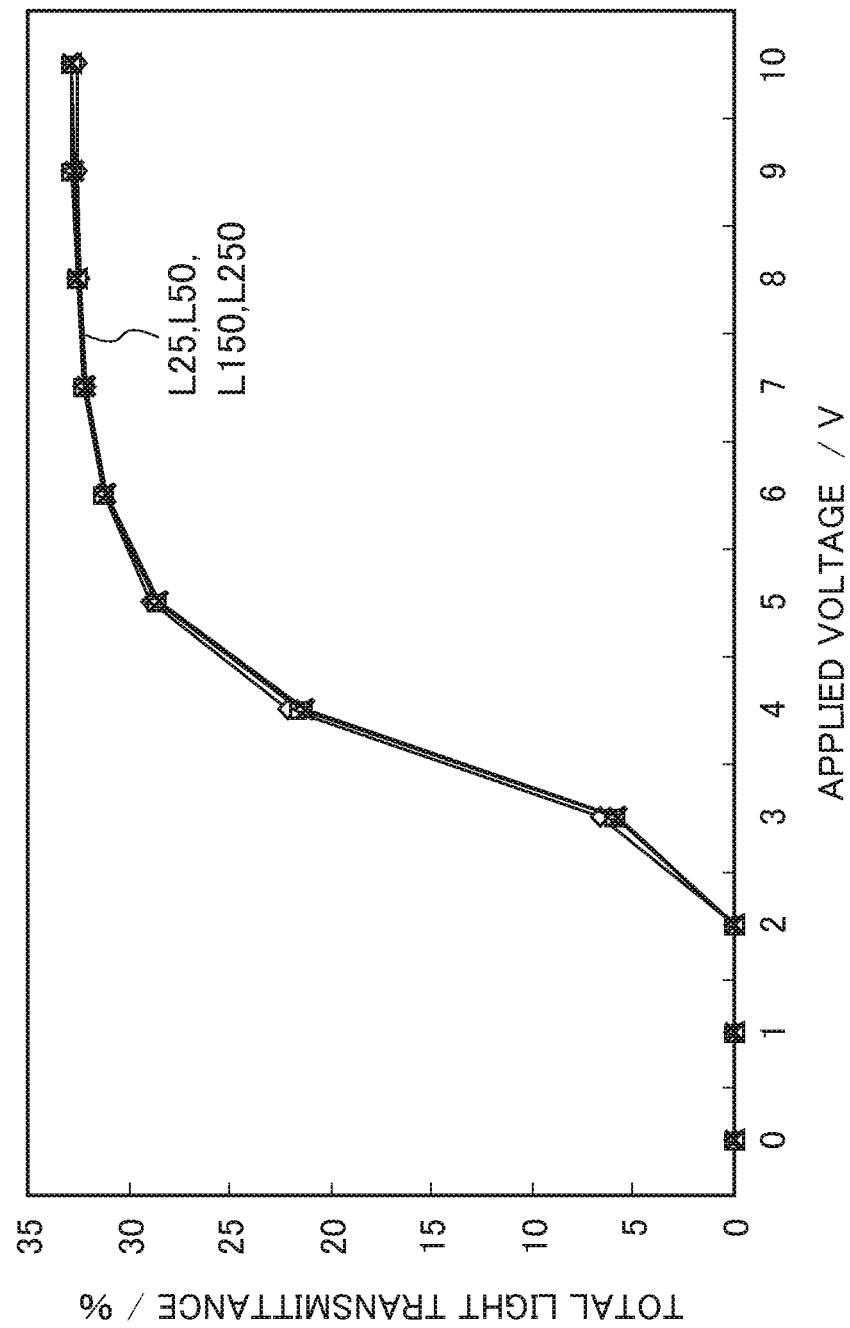
FIG. 6 is a diagram illustrating a power feed point in the light modulating system in FIG. 2.
Figure 7:
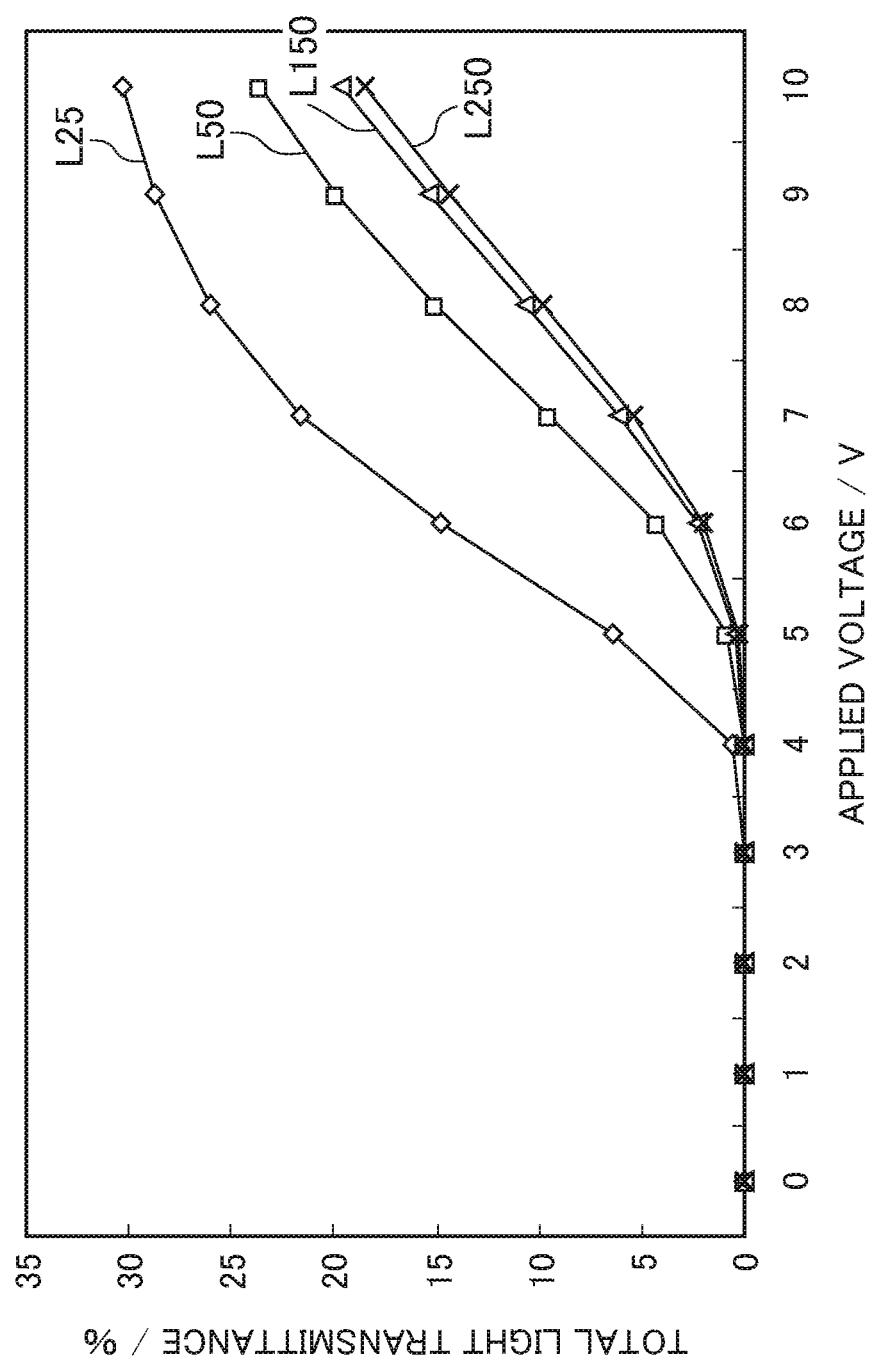
FIG. 7 is a diagram of an example in which the frequency of a power source provided for describing a power feed point in the light modulating system in FIG. 2 is changed.

FIGS. 6 and 7 are diagrams illustrating the measurement results of the transmittance according to the distance L from the power feed point P with the frequency of the drive power V0 being 60 Hz and 480 Hz, respectively, in comparison with FIG. 3. According to the measurement results in FIG. 6 and FIG. 7, when the frequency of the drive power V0 is 480 Hz, it is determined that, as the distance L from the power feed point P increases, the decrease in transmittance is remarkable. By doing so, in a case where the light modulating film 10 is produced with a large area, a local decrease in transmittance is predicted in a portion far away from the power feed point P.

Therefore, in this embodiment, as illustrated in FIG. 2, the distance L from an arbitrary point in the surface of the light modulating film 10 to the power feed point P is set to be 1,500 mm or less. Herein, experiments were carried out with the light modulating film 10 being manufactured with a square shape having a side length of 280 mm and, as illustrated in FIG. 3, even in a case where the distance L was 330 mm in driving with a frequency of 240 Hz or less, it is understood that a local decrease in transmittance such as less than 26% is not observed. In addition, in this experiment, the power feed point P is the center of one side, and in the light modulating film described above in FIG. 3, the distance L from the power feed point P to the end of the opposite side farthest away from the power feed point P is about 330 mm $(((280)^2+(280/2)^2)^{1/2})$.

In addition, according to the results of the experiments and the results of the transmittance illustrated in FIGS. 4 and 5 obtained on the basis of these results, it was confirmed that, when the distance L from an arbitrary point in the surface of the light modulating film 10 to the power feed point P is set to 1,500 mm or less, it was possible to prevent a local decrease in transmittance such as the transmittance of less than 26%. Therefore, for example, in a case where the light modulating film has a larger size than the example illustrated in FIG. 2, by setting the power feed point P so that the distance L to the power feed point P is 1,500 mm or less, it is possible to prevent a local decrease in transmittance of the light modulating film.

In addition, as described above, since the light modulating film is used for a portion such as each window of a vehicle where external light is incident or a wide area portion such as a window of a building, it is preferable that the distance L from the power feed point is at least 50 mm or more. In addition, according to the measurement result in FIG. 3, in a case where the distance L is 50 mm or more, the decrease in transmittance tends to be remarkable due to the increase in frequency. However, by setting the frequency of the power source and the sheet resistance, it is possible to suppress a local change in transmittance to the utmost.

The light modulating system 1 according to this embodiment described above obtains the following effects.

(1) The light modulating system 1 according to this embodiment includes the light modulating film 10 and the drive power source 2, and in the light modulating film 10, the liquid crystal layer 18 is interposed between the first laminated body 15D and the second laminated body 15U, and the transmitted light is controlled by controlling the alignment of the liquid crystal molecules of the liquid crystal layer 18 of a VA type. The first laminated body 15D includes at least the first substrate 16 and the first electrode 21, and the second laminated body 15U includes at least the second substrate 25 and the second electrode 26. In addition, each of the first electrode 21 and the second electrode 26 has sheet resistance of $50\Omega/\square$ or more and $300\Omega/\square$ or less, and a distance L from the power feed point P to the farthest-away position in the light modulating film 10 is 1,500 mm or less. In addition, the drive power source 2 supplies a drive power with a rectangular wave having a frequency of 240 Hz or less. By doing so, in the light modulating system 1, by sufficiently suppressing the waveform rounding due to the charging and discharging of the electrostatic capacitor between the electrodes 21 and 26, it is possible to suppress the local decrease in the transmittance to the utmost, so that it is possible to ensure high performance with respect to the control of the transmitted light.

(2) In addition, in the light modulating system 1 according to this embodiment, the drive power source 2 supplies the drive power V0 with a rectangular wave having a frequency of more than 45 Hz, so that it is possible to suppress flicker caused by switching of the polarity of the power source from occurring.

(3) In the light modulating system 1 according to this embodiment, since the distance L from the power feed point P to the farthest-away position in the surface of the light modulating film 10 is 50 mm or more, the light modulating system can be provided in a portion such as each window of the vehicle where external light is incident or a wide area portion such as a window of a building.

(4) In the light modulating system 1 according to this embodiment, the total light transmittance of each of the laminated body 15U of the first substrate 16 and the first electrode 21 and the laminated body 15D of the second substrate 25 and the second electrode 26 is set to 85% or more and 92% or less, and thus, it is possible to effectively avoid the decrease in transmittance by these laminated bodies, so that it is possible to ensure sufficient transmittance at the time of light transmission and to ensure higher performance with respect to the control of the transmitted light.

(5) In the method for driving the light modulating film according to this embodiment, the drive power V0 is supplied from the drive power source 2 to drive the light modulating film 10, and in the light modulating film 10, the liquid crystal layer 18 is interposed between the first laminated body 15D and the second laminated body 15U, and the transmitted light is controlled by controlling the alignment of the liquid crystal molecules of the liquid crystal layer 18 of a VA type. The first laminated body 15D includes at least the first substrate 16 and the first electrode 21, and the second laminated body 15U includes at least the second substrate 25 and the second electrode 26. In addition, each of the first electrode 21 and the second electrode 26 has sheet resistance of 50Ω/□ or more and 300Ω/□ or less, and the distance L from the power feed point P to the farthest-away position in the light modulating film 10 is 1,500 mm or less. In addition, the drive power source 2 supplies a drive power with a rectangular wave having a frequency of 240 Hz or less. By doing so, it is possible to sufficiently suppress the waveform rounding and to prevent a local decrease in the transmittance, and in the method for driving the light modulating film, it is possible to ensure high performance with respect to the control of the transmitted light.

Second Embodiment

[Light Modulating Film]

Figure 8:
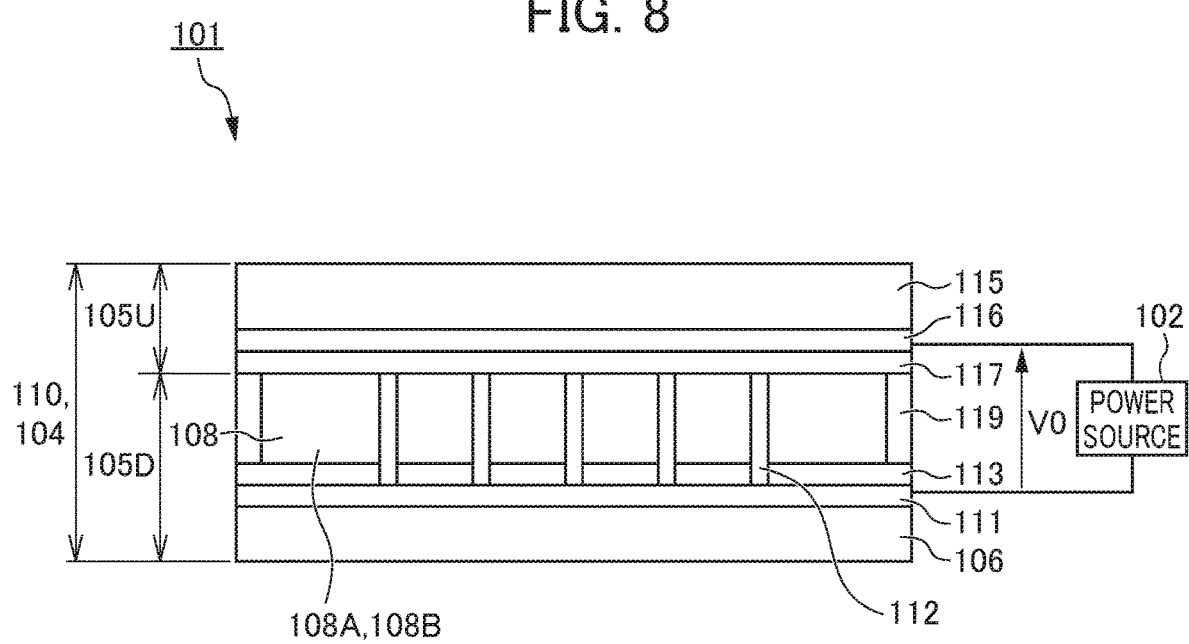
FIG. 8 is a diagram illustrating a light modulating system according to a second embodiment of the present invention.

FIG. 8 is a diagram illustrating a light modulating system according to the second embodiment. The light modulating system 101 according to this embodiment is configured in the same manner as the light modulating system 1 according to the first embodiment, except that the configuration related to the light modulating film 110 is different.

The light modulating film 110 is formed of a light modulating film of a guest-host type. For this reason, the light modulating film 110 is configured with the liquid crystal cell 104 of the guest-host type, and the linear polarization plate provided in the light modulating film 10 according to the above-described first embodiment is omitted.

[Liquid Crystal Cell]

The liquid crystal cell 104 is formed by interposing the liquid crystal layer 108 with a film-shaped lower laminated body (first laminated body) 105D and a film-shaped upper laminated body (second laminated body) 105U.

[Lower Laminated Body and Upper Laminated Body]

The lower laminated body 105D is formed by arranging a transparent electrode 111, a spacer 112, and an alignment layer 113 on a substrate 106. The upper laminated body 105U is formed by arranging a transparent electrode 116 and an alignment layer 117 on a substrate 115. The light modulating film 110 changes the electric field applied to the liquid crystal molecules 108A provided in the liquid crystal layer 108 by driving the transparent electrodes 111 and 116 provided in the upper laminated body 105U and the lower laminated body 105D and, thus, can control the transmittance of the incident light.

[Substrate]

Various transparent film materials which can be applied as this type of film material can be applied for the substrates 106 and 115. In this embodiment, a polycarbonate film is used for the substrate 106 and 115, but a cycloolefin polymer (COP) film, a TAC film, or the like may be applied.

[Transparent Electrode]

Various electrode materials which are applied as this type of film material can be applied for the transparent electrodes 111 and 116, and in this embodiment, the transparent electrodes are formed of a transparent electrode material made of indium tin oxide (ITO).

[Spacer]

The spacer 112 is provided to regulate the thickness of the liquid crystal layer 108, and various types of resin materials can be widely applied. In this embodiment, the spacer 112 is produced with a photoresist and is produced by coating the photoresist on the substrate 106 on which the transparent electrode 111 is formed and performing exposure and development. The spacer 112 can be provided at an arbitrary laminating position as long as the spacer is on the substrate 106. For example, besides the configuration illustrated in FIG. 8, the spacer may be provided on the alignment layer 113, or the spacer may be provided between the substrate 106 and the transparent electrode 111. In a case where electrodes are provided only on one laminated body, the spacer 112 may be provided directly on the substrate, or an alignment layer may be formed on the substrate and the spacer may be provided on the alignment layer.

For the spacer 112, a bead spacer can be applied instead of the photoresist. In addition, as the bead spacer, not only a spherical shape but also a shape such as a rod shape (cylindrical shape) or an elliptical spherical shape may be used. In a case where the bead spacer is used for the spacer 112, the bead spacer is arranged by being dispersed on the alignment layer after the alignment layer is formed. In this case, from the viewpoint of suppressing the movement of the bead spacer in the liquid crystal layer 108 (on the alignment layer), a fixing layer formed of an adhesive or the like may be provided on the surface of the bead spacer. In addition, from the viewpoint of suppressing the movement of the bead spacer in the liquid crystal layer 108, the bead spacer may be dispersed in advance in the resin for forming the alignment layer, so that the bead spacer is arranged together with the formation of the alignment layer, or the bead spacer may be dispersed in advance in the liquid crystal material constituting the liquid crystal layer, so that the bead spacer is arranged together with the formation of the liquid crystal layer. In addition, similarly to the spacer of the photoresist described above, the bead spacer may be arranged in any one of the first laminated body and the second laminated body, or the bead spacer may be arranged in each of the laminated bodies. In addition, the same applies to the spacer of the light modulating film according to the above-described first embodiment.

[Alignment Layer]

The alignment layers 113 and 117 are produced by performing a rubbing process on a polyimide resin layer. In addition, the alignment layers 113 and 117 can adopt various configurations capable of exhibiting the alignment regulating force to the liquid crystal material related to the liquid crystal layer 108, and the alignment layer may be formed by a so-called light alignment layer. Although various materials to which the light alignment type can be applied can be applied as the material of the light alignment layer, for example, a photodimerization type material of which alignment is not changed by irradiation with ultraviolet light, for example, after the material is aligned can be used. This photodimerization type material discloses in "M. Schadt, K. Schmitt, V. Kozinkov and V. Chigrinov: Jpn. J. Appl. Phys., 31, 2155 (1992)", "M. Schadt, H. Seiberle and A. Schuster: Nature, 381, 212 (1996)", and the like.

[Liquid Crystal Layer]

The liquid crystal layer 108 is formed by a solution of a guest-host liquid crystal formed of a guest-host liquid crystal molecule 108A and a dichroic dye 108B formed into a rod shape, and various liquid crystal layer materials which can be applied for this type of light modulating film 110 can be widely applied.

In the light modulating film 110, the electric field of the liquid crystal layer 108 is changed by changing the voltage applied to the transparent electrodes 111 and 116, and the alignment of the liquid crystal molecules 108A is changed between the vertical alignment and the horizontal alignment. In the light modulating film 110, in association with the change in alignment of the liquid crystal molecules 108A, the transmission of the incident light is changed by the dichroic dye 108B of which direction in the long axis direction in the ellipse is changed between the thickness direction of the liquid crystal layer 108 and the direction perpendicular to the thickness direction.

The light modulating film 110 is configured as so-called normally white in which a so-called positive type liquid crystal composition is applied to the liquid crystal molecules 108A, so that the liquid crystal molecules are vertically aligned (aligned in the thickness direction of the light modulating film) at the time of application of no electric field to the liquid crystal layer 108, and the liquid crystal molecules are horizontally aligned (aligned in a direction perpendicular to the thickness direction of the light modulating film) at the time of application of an electric field to the liquid crystal layer 108. In addition, the light modulating film 110 may be configured as so-called normally black in which a so-called negative type liquid crystal composition is applied to liquid crystal molecules, so that the liquid crystal molecules are vertically aligned at the time of application of no electric field to the liquid crystal layer 108, and the liquid crystal molecules are horizontally aligned at the time of application of an electric field to the liquid crystal layer 108. In addition, the liquid crystal molecules may be rotated at the time of horizontal alignment, and various driving types such as a VA type or a TN type may be widely applied. Herein, in the guest-host type, the vertical alignment (VA) type is a type in which the liquid crystal molecules of the liquid crystal layer 108 are vertically aligned at the time of application of no electric field, and the liquid crystal molecules are horizontally aligned at the time of application of an electric field. The Twisted Nematic (TN) type is a type in which the alignment of liquid crystal molecules is changed between the vertical direction (thickness direction) and the horizontal twist direction according to application of an electric field.

[Sealing Material]

In the light modulating film 110, a sealing material 119 is arranged so as to surround the liquid crystal layer 108, and the upper laminated body 105U and the lower laminated body 105D are integrally retained by the sealing material 119, so that leakage of the liquid crystal material is prevented. For example, a thermosetting resin such as an epoxy resin or an acrylic resin, an ultraviolet curable resin, or the like can be applied for the sealing material 119.

[Frequency of Power Source]

FIG. 9 is a diagram illustrating a relationship between the transmittance and the power source frequency at the distance L from the power feed point at the time of light transmission of the light modulating system according to this embodiment. Herein, the transmittance of L=25 mm to 100 mm illustrated in FIG. 9 is an actual measurement result, and the transmittance of L=250 mm to 2,000 mm is a result obtained by obtaining an approximate expression on the basis of the actual measurement result described above and obtaining the transmittance on the basis of the approximate expression. FIG. 10 is a diagram illustrating the determination result of the transmittance in FIG. 9. In FIG. 10, similarly to the case of the first embodiment (FIG. 5), "○" indicates the transmittance of 29% or more, "Δ" indicates the transmittance of 26% or more and less than 29%, and "X" indicates the transmittance of less than 26%. The determination results "○" and "Δ" indicate that the transmittance is 26% or more and is practically sufficient.

According to FIG. 9, in the light modulating film 110 of the guest-host type, the transmittance decreases due to an increase in the distance L, and furthermore, the decrease in transmittance tends to become more conspicuous as the frequency becomes higher. If the distance L from the power feed point is 1,250 mm or less, a necessary and sufficient transmittance (26% or more) can be obtained even with a rectangular wave having a frequency of 1,000 Hz. However, in a case where the driving frequency is set to such a high frequency as 1,000 Hz, the power consumption due to the driving of the light modulating film 110 becomes too large, and thus, it is not preferable. Therefore, in the light modulating system 101 having the light modulating film 110 of the guest-host type, the driving frequency is set to 480 Hz or less, and when the distance L is 1,250 mm or less, a necessary and sufficient transmittance is realized, and the power consumption is prevented from becoming too large due to the driving of the light modulating film 110. In addition, in this embodiment, similarly to the above-described first embodiment, by setting the driving frequency to be higher than 45 Hz, it is possible to suppress the occurrence of flicker caused by switching of the polarity of the power source. In the light modulating system 101 according to this embodiment described above, the drive power V0 is supplied in the range of amplitude of 0 V to 20 V with a rectangular wave having a frequency of more than 45 Hz and a frequency of 480 Hz or less.

[Sheet Resistance]

In addition, in this embodiment, in the light modulating film 110, the transparent electrodes 111 and 116 are formed in the same manner as the transparent electrodes in the laminated bodies 15U and 15D in the first embodiment, so that the sheet resistance is 50Ω/□ or more and 300Ω/□ or less. In addition, the sheet resistance is preferably set to be 50Ω/□ or more and 200Ω/□ or less, more preferably 50Ω/□ or more and 150 Ω/□ or less. By doing so, in this embodiment, it is possible to effectively prevent the flicker by setting the frequency of the drive power, further ensure sufficient transmittance, and efficiently control lighting.

If the sheet resistance becomes larger than the above-mentioned range, the waveform rounding also becomes large, so that the transmittance decreases. In addition, flicker due to a decrease in frequency of the drive power source is also conspicuous. For this reason, even in a case where the light modulating film is driven in the above-mentioned frequency range, there is a concern that, the flicker may be perceived, and in addition, the decrease in transmittance may be perceived. Therefore, in this embodiment, it is possible to ensure sufficient transmittance by setting the range of the sheet resistance as described above and effectively avoiding the flicker and to ensure high performance with respect to the control of the transmitted light.

[Transmittance of Laminated Body]

In addition, similarly to the first embodiment, the light modulating film 110 is prepared so that the transmittance (total light transmittance) of each of the upper laminated body 105U and the lower laminated body 105D is also 85% or more and 92% or less. In addition, the transmittance of each of the laminated bodies 105U and 105D is preferably 89% or more and 90% or less. By doing so, in the light modulating system, by the upper laminated body 105U and the lower laminated body 105D, it is possible to sufficiently prevent a decrease in transmittance of the light modulating film 110.

[Power Feed Point]

Still further, in this embodiment, it is preferable that the distance L from an arbitrary point in the surface of the light modulating film 110 to the power feed point P is 1,250 mm or less. This is because, according to the results illustrated in FIGS. 8 and 9, in the driving at a frequency of 480 Hz or less, in a case where the distance L is 1,250 mm or less, transmittance of 26% or more can be ensured, but if the distance L exceeds 1,250 mm, it becomes difficult to ensure the transmittance of 26% or more. In this embodiment described above, the size of the light modulating film 110 and the position of the power feed point P are set so that the distance L from the power feed point to the farthest-away position in the surface of the light modulating film 110 is 1,250 mm or less, and thus, it is possible to prevent a local decrease in transmittance.

In addition, similarly to the above-described first embodiment, since the light modulating film 110 is used for a portion such as each window of a vehicle where external light is incident or a wide area portion such as a window of a building, it is preferable that the distance L from the power feed point is at least 50 mm or more. In addition, in a case where the distance L is 50 mm or more, the transmittance decreases due to an increase in the frequency. However, by setting the frequency of the power source and sheet resistance, it is possible to suppress the local change in the transmittance to the utmost.

The light modulating system 101 according to this embodiment described above obtains the following effects.

(1) The light modulating system 101 according to this embodiment includes the light modulating film 110 and the drive power source 102, and in the light modulating film 110, the liquid crystal layer 108 including the liquid crystal molecule 108A and the dichroic dye 108B is interposed between the first laminated body 105D and the second laminated body 105U, and the transmitted light is controlled by controlling the alignment of the liquid crystal molecules 108A and the dichroic dye 108B of the liquid crystal layer 108. The first laminated body 105D includes at least the first substrate 106 and the first electrode 111, and the second laminated body 105U includes at least the second substrate 115 and the second electrode 116. In addition, each of the first electrode 111 and the second electrode 116 has sheet resistance of 50Ω/□ or more and 300Ω/□ or less, the distance L from the power feed point P to the farthest-away position in the surface of the light modulating film 110 is 1,250 mm or less, and the drive power source 102 supplies a drive power with a rectangular wave having a frequency of 480 Hz or less. By doing so, by sufficiently suppressing the waveform rounding due to charging and discharging of the electrostatic capacitor between the electrodes 111 and 116 with respect to the light modulating film of the guest-host type, it is possible to prevent the local decrease in transmittance, so that it is possible to ensure high performance with respect to the control of the transmitted light.

(2) In addition, in the light modulating system 101 according to this embodiment, the drive power source 102 supplies the drive power V0 with a rectangular wave having a frequency exceeding 45 Hz, so that it is possible to suppress flicker caused by switching of the polarity of the power source.

(3) In the light modulating system 101 according to this embodiment, since the distance L from the power feed point P to the farthest-away position in the surface of the light modulating film 110 is 50 mm or more, the light modulating system can be provided in a portion such as each window of a vehicle where external light is incident or a wide area portion such as a window of a building.

(4) In the light modulating system 101 according to this embodiment, the total light transmittance of each of the laminated body 105D of the first substrate 106 and the first electrode 111 and the laminated body 105U of the second substrate 115 and the second electrode 116 is set to 85% or more and 92% or less, and thus, it is possible to effectively avoid the decrease in transmittance by these laminated bodies, so that it is possible to ensure sufficient transmittance at the time of light transmission and to ensure higher performance with respect to the control of the transmitted light.

(5) The method for driving the light modulating film 110 according to this embodiment is a method for driving the light modulating film 110 by supplying a drive power from the drive power source 102, and in the light modulating film 110, the liquid crystal layer 108 is interposed between the first laminated body 105D and the second laminated body 105U, and the transmitted light is controlled by controlling the alignment of the liquid crystal molecules of the liquid crystal layer 108 is controlled of the guest-host type. The first laminated body 105D includes at least the first substrate 106 and the first electrode 111, and the second laminated body 105U includes at least the second substrate 115 and the second electrode 116. In addition, each of the first electrode 111 and the second electrode 116 has sheet resistance of 50Ω/□ or more and 300Ω/□ or less, and a distance L from the power feed point P to the farthest-away position in the surface of the light modulating film 110 is 1,250 mm or less, and the drive power source supplies the drive power with a rectangular wave having a frequency of 480 Hz or less. By doing so, with respect to the light modulating film of the guest-host type, by sufficiently suppressing the waveform rounding, it is possible to prevent a local decrease in the transmittance, and in the driving method of the light modulating film 110, it is possible to ensure high performance with respect to the control of the transmitted light.

Third Embodiment

Figure 11:
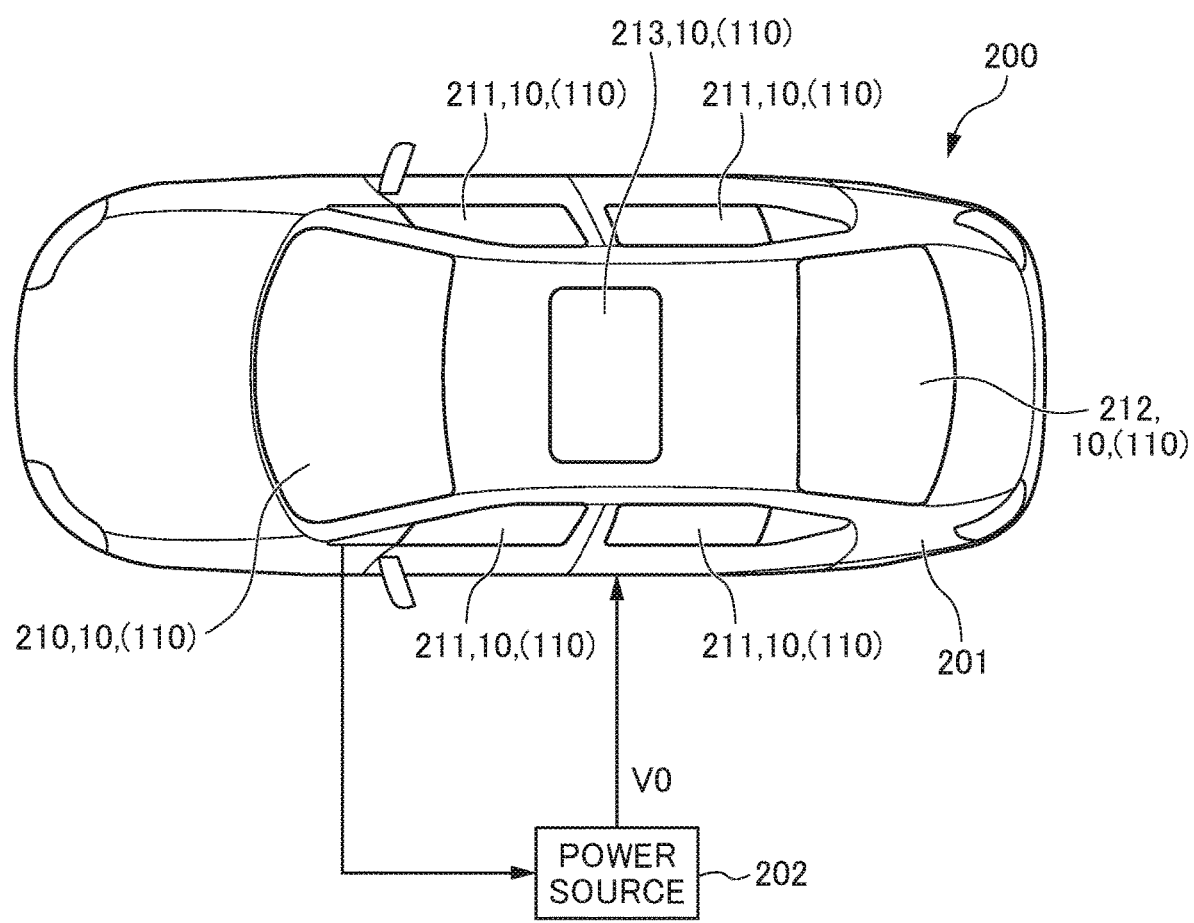
FIG. 11 is a diagram illustrating a vehicle according to a third embodiment of the present invention.

FIG. 11 is a diagram illustrating a vehicle according to a third embodiment of the present invention. FIG. 11 is a plan diagram as viewed from the upper side of the vehicle in the vertical direction. The vehicle 200 is a passenger vehicle equipped with the above-described light modulating system according to the first embodiment or the second embodiment. In the vehicle 200, the light modulating film according to the first embodiment or the second embodiment described above is arranged in all portions (the front window 210, the side window 211, the rear window 212, and the roof window 213) where the external light is incident. In addition, by controlling the operation of the drive power source 202 according to the operation of the passenger and by changing the amplitude of the drive power V0 to be output to each of the light modulating films 10 and 110, the incidence of the external light is controlled.

In the vehicle 200 according to this embodiment described above, the light modulating films 10 and 110 of the VA type or the guest-host type are applied, and in a portion such as a front window where external light is incident, in which the light modulating film is arranged, by sufficiently suppressing the waveform rounding due to the charging and discharging of the electrostatic capacitor, it is possible to suppress the local decrease in transmittance to the utmost, so that it is possible to ensure high performance with respect to the control of the transmitted light. In addition, the above description, the example in which the light modulating film is arranged in all portions of the vehicle 200 where external light is incident is illustrated. However, the invention is not limited to this example, and the light modulating film may be arranged in some or a plurality of these portions.

OTHER EMBODIMENTS

Heretofore, although specific configurations suitable for the implementation of the present invention have been described in detail, the present invention can be variously modified in the above embodiments without departing from the spirit of the present invention.

EXPLANATION OF REFERENCE NUMERALS

1 LIGHT MODULATING SYSTEM
2, 201 DRIVE POWER SOURCE
10, 101 LIGHT MODULATING FILM
12, 13 LINEAR POLARIZATION PLATE
12A, 13A PHASE DIFFERENCE FILM
14, 104 LIQUID CRYSTAL CELL
15D, 105D LOWER LAMINATED BODY
15U, 105U UPPER LAMINATED BODY
16, 25, 106, 115 SUBSTRATE
18, 108 LIQUID CRYSTAL LAYER
21, 26, 111, 116 TRANSPARENT ELECTRODE
22, 112 SPACER
23, 27, 113, 117 ALIGNMENT LAYER
29, 119 SEALING MATERIAL
108A LIQUID CRYSTAL MOLECULE
108B DICHROIC DYE
200 VEHICLE
210 FRONT WINDOW
211 SIDE WINDOW
212 REAR WINDOW
213 ROOF WINDOW

The invention claimed is:

1. A light modulating system comprising a light modulating film and a drive power source supplying a drive power to the light modulating film,
    wherein the light modulating film is a light modulating film in which a liquid crystal layer is interposed between a first laminated body and a second laminated body, and transmitted light is controlled by the liquid crystal layer of a vertical alignment type by controlling alignment of liquid crystal molecules of the liquid crystal layer in a thickness direction of the light modulating film at time of application of no electric field, and in a direction perpendicular to the thickness direction of the light modulating film at time of application of an electric field,
    wherein the first laminated body includes at least a first substrate and a first electrode,
    wherein the second laminated body includes at least a second substrate and a second electrode,
    wherein each of the first electrode and the second electrode has sheet resistance of 50 Ω/square or more and 300 Ω/square or less, and when a farthest-away position is defined as a position where a distance from a power feed point is longest on a surface of the light modulating film, a distance from the power feed point to the farthest-away position is 1,500 mm or less,
    wherein the drive power source supplies the drive power with a rectangular wave having a frequency of 240 Hz or less,
    wherein the light modulating film enters a light shielding state at time of application of no electric field, and enters a light transmitting state at time of application of an electric field, and
    wherein the light modulating film has transmittance at time of light transmission of 26% or more.

2. The light modulating system according to claim 1, wherein
    the drive power source supplies the drive power with a rectangular wave having a frequency of more than 45 Hz.

3. The light modulating system according to claim 1, wherein
    the distance from the power feed point to the farthest-away position is 50 mm or more.

4. The light modulating system according to claim 1, wherein
    each of the laminated body of the first substrate and the first electrode and the laminated body of the second substrate and the second electrode has total light transmittance of 85% or more and 92% or less.

5. A vehicle provided with the light modulating system according to claim 1.

6. A method for driving a light modulating film comprising supplying a drive power from a drive power source to drive the light modulating film,
    wherein the light modulating film is a light modulating film in which a liquid crystal layer is interposed between a first laminated body and a second laminated body, and transmitted light is controlled by the liquid crystal layer of a vertical alignment type by controlling alignment of liquid crystal molecules of the liquid crystal layer in a thickness direction of the light modulating film at time of application of no electric field, and in a direction perpendicular to the thickness direction of the light modulating film at time of application of an electric field, wherein the first laminated body is provided with at least a first substrate and a first electrode, wherein the second laminated body is provided with at least a second substrate and a second electrode, wherein each of the first electrode and the second electrode has sheet resistance of 50 Ω/square or more and 300 Ω/square or less, and when a farthest-away position is defined as a position where a distance from a power feed point is longest on a surface of the light modulating film, a distance from the power feed point to the farthest-away position is 1,500 mm or less, wherein the drive power source supplies a drive power with a rectangular wave having a frequency of 240 Hz or less, wherein the light modulating film enters a light shielding state at time of application of no electric field, and enters a light transmitting state at time of application of an electric field, and wherein the light modulating film has transmittance at time of light transmission of 26% or more.

7. A light modulating system comprising a light modulating film and a drive power source supplying a drive power to the light modulating film, wherein the light modulating film is a light modulating film in which a liquid crystal layer containing liquid crystal molecules and a dichroic dye is interposed between a first laminated body and a second laminated body, and transmitted light is controlled by controlling alignment of the liquid crystal molecules and the dichroic dye of the liquid crystal layer in a direction perpendicular to a thickness direction of the light modulating film at time of application of no electric field, and in the thickness direction of the light modulating film at time of application of an electric field, wherein the first laminated body includes at least a first substrate and a first electrode, wherein the second laminated body includes at least a second substrate and a second electrode, wherein each of the first electrode and the second electrode has sheet resistance of 50 Ω/square or more and 300 Ω/square or less, wherein, when a farthest-away position is defined as a position where a distance from a power feed point is longest on a surface of the light modulating film, a distance from the power feed point to the farthest-away position is 1,250 mm or less, wherein the drive power source supplies a drive power with a rectangular wave having a frequency of 480 Hz or less, wherein the light modulating film enters a light shielding state at time of application of no electric field, and enters a light transmitting state at time of application of an electric field, and wherein the light modulating film has transmittance at time of light transmission of 26% or more.

8. A method for driving a light modulating film comprising supplying a drive power from a drive power source to drive the light modulating film, wherein the light modulating film is a light modulating film in which a liquid crystal layer is interposed between a first laminated body and a second laminated body, and transmitted light is controlled by the liquid crystal layer of a guest-host type by controlling alignment of liquid crystal molecules of the liquid crystal layer in a direction perpendicular to a thickness direction of the light modulating film at time of application of no electric field, and in the thickness direction of the light modulating film at time of application of an electric field, wherein the first laminated body includes at least a first substrate and a first electrode, wherein the second laminated body includes at least a second substrate and a second electrode, wherein each of the first electrode and the second electrode has sheet resistance of 50 Ω/square or more and 300 Ω/square or less, wherein, when a farthest-away position is defined as a position where a distance from a power feed point is longest on a surface of the light modulating film, a distance from the power feed point to the farthest-away position is 1,250 mm or less, wherein the drive power source supplies a drive power with a rectangular wave having a frequency of 480 Hz or less, wherein the light modulating film enters a light shielding state at time of application of no electric field, and enters a light transmitting state at time of application of an electric field, and wherein the light modulating film has transmittance at time of light transmission of 26% or more.

* * * * *